United States Patent
Marwah et al.

(10) Patent No.: US 9,380,221 B2
(45) Date of Patent: Jun. 28, 2016

(54) METHODS AND APPARATUS FOR LIGHT FIELD PHOTOGRAPHY

(71) Applicants: Kshitij Marwah, Rajouri Garden (IN); Gordon Wetzstein, Cambridge, MA (US); Ramesh Raskar, Cambridge, MA (US)

(72) Inventors: Kshitij Marwah, Rajouri Garden (IN); Gordon Wetzstein, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 176 days.

(21) Appl. No.: 14/192,800

(22) Filed: Feb. 27, 2014

(65) Prior Publication Data

US 2014/0240532 A1    Aug. 28, 2014

Related U.S. Application Data

(60) Provisional application No. 61/769,749, filed on Feb. 27, 2013.

(51) Int. Cl.
*H04N 5/225* (2006.01)
*H04N 5/228* (2006.01)
*G02B 26/00* (2006.01)
*H04N 5/262* (2006.01)

(52) U.S. Cl.
CPC .......... *H04N 5/2621* (2013.01); *H04N 5/2254* (2013.01)

(58) Field of Classification Search
CPC .......... H04N 13/0275; H04N 13/0278; H04N 13/0292; H04N 13/0282; G06T 2207/10052; G06T 2200/21

USPC .......... 348/340, 222.1, 335, 231.99; 345/240; 359/237, 239

See application file for complete search history.

(56) References Cited

U.S. PATENT DOCUMENTS

2003/0184692 A1* 10/2003 Nagae ............... G02F 1/133514
                                                            349/86
2007/0285554 A1* 12/2007 Givon .................... G03H 1/268
                                                            348/340

(Continued)

OTHER PUBLICATIONS

Hitomi, Y., et al., 2011, Video from a single coded exposure photograph using a learned over-complete dictionary. Proceedings of the 2011 International Conference on Computer Vision, ICCV '11, pp. 287-294, IEEE Computer Society Washington, DC, USA, 2011.*

(Continued)

*Primary Examiner* — Sinh Tran
*Assistant Examiner* — Xi Wang
(74) *Attorney, Agent, or Firm* — Stephen R. Otis (57) ABSTRACT

In exemplary implementations of this invention, a light field camera uses a light field dictionary to reconstruct a 4D light field from a single photograph. The light field includes both angular and spatial information and has a spatial resolution equal to the spatial resolution of the imaging sensor. Light from a scene passes through a coded spatial light modulator (SLM) before reaching an imaging sensor. Computer processors reconstruct a light field. This reconstruction includes computing a sparse or compressible coefficient vector using a light field dictionary matrix. Each column vector of the dictionary matrix is a light field atom. These light field atoms each, respectively, comprise information about a small 4D region of a light field. Reconstruction quality may be improved by using an SLM that is as orthogonal as possible to the dictionary.

10 Claims, 4 Drawing Sheets

(56) References Cited

U.S. PATENT DOCUMENTS

| | | | | |
|---|---|---|---|---|
| 2009/0097092 A1* | 4/2009 | Luebke | ................ | G02B 27/225 359/237 |
| 2011/0069324 A1* | 3/2011 | Kang | ................... | G02B 3/0006 356/625 |
| 2013/0215231 A1* | 8/2013 | Hiramoto | .......... | G02B 27/0075 348/46 |
| 2014/0176540 A1* | 6/2014 | Tosic | ...................... | G06T 17/00 345/420 |

OTHER PUBLICATIONS

Aharon, M., 2006, Overcomplete Dictionaries for Sparse Representation of Signals. PhD Thesis, Technion—Israel Institute of Technology, Nov. 2006.

Babacan, S., et al., 2009, Compressive sensing of light fields. 2009 16th IEEE International Conference on Image Processing (ICIP), pp. 2337-2340, Nov. 2009.

Candes, E., et al., 2010, Compressed Sensing with Coherent and Redundant Dictionaries. arXiv.org, arXiv:1005.2613 [math.NA], 2010.

Elad, M., 2006, Image Denoising Via Sparse and Redundant Representations Over Learned Dictionaries. IEEE Transactions on Image Processing, vol. 15, Issue 12, pp. 3736-3745, Dec. 2006.

Horev, I., et al., Apr. 2012, Adaptive image compression using sparse dictionaries. 19th International Conference on Systems, Signals and Image Processing (IWSSIP), pp. 592-595, Apr. 2012.

Kanakaraj, J., et al., Feb. 9, 2012, Super-resolution image reconstruction using sparse parameter dictionary framework. Scientific Research and Essays, vol. 7, No. 5, pp. 586-592, Feb. 9, 2012.

Levoy, M., et al., 1996, Light Field Rendering. Proceeding ACM SIGGRAPH, 1996.

Ng, R., et al., 2005, Light Field Photography with a Hand-Held Plenoptic Camera. Stanford University Computer Science Tech Report CSTR 2005-02, Apr. 2005.

Veeraraghavan, A., et al., 2007, Dappled photography: mask enhanced cameras for heterodyned light fields and coded aperture refocusing. ACM Transactions on Graphics (TOG), Proceedings of ACM SIGGRAPH 2007 TOG, vol. 26 Issue 3, Article No. 69, Jul. 2007.

Wilburn, B., et al., 2005, High performance imaging using large camera arrays. ACM Transactions on Graphics (TOG), Proceedings of ACM SIGGRAPH 2005 TOG, vol. 24, Issue 3, pp. 765-776, Jul. 2005, ACM New York, NY, USA.

Xu, Z., et al., A high-resolution lightfield camera with dual-mask design. Proc. SPIE 8500, Image Reconstruction from Incomplete Data VII, 85000U, Oct. 15, 2012, doi:10.1117/12.940766.

* cited by examiner

METHODS AND APPARATUS FOR LIGHT FIELD PHOTOGRAPHY

RELATED APPLICATIONS

This application is a non-provisional of, and claims the benefit of the filing date of, U.S. Provisional Application No. 61/769,749, filed Feb. 27, 2013, the entire disclosure of which is herein incorporated by reference.

STATEMENT REGARDING FEDERALLY SPONSORED RESEARCH OR DEVELOPMENT

This invention was made with government support under Grant No. IIS-1116452 awarded by the National Science Foundation and under Contract No. W911NF-11-C-0210 awarded by the Army Research Office. The government has certain rights in the invention.

FIELD OF THE TECHNOLOGY

The present invention relates generally to light field imaging.

COMPUTER PROGRAM LISTING

Attached are four ASCII text files: (1) reconstructLightField.txt, created Feb. 27, 2014 with a size of about 15 KB; (2) drawLightField4D.txt, created Feb. 27, 2014 with a size of about 6 KB; (3) animateLightField.txt, created Jan. 27, 2014 with a size of about 2 KB; and (4) learnDictionary.txt, created Feb. 27, 2014 with a size of about 4 KB. Each of these four ASCII text files comprises a computer program listing for software in a prototype implementation of this invention. These four ASCII text files are each incorporated by reference herein.

BACKGROUND

A light field is a mathematical description of intensity, spatial position and direction of light rays in a region. A light field may be parameterized in different ways. For example, the position and direction of a light ray in a 4D light field may be described by 2D spatial coordinates of a point at which the ray intersects a first plane and by 2D spatial coordinates of a second point at which the ray intersects a second, parallel plane. Or, for example, the position and direction of a light ray in a 4D light field may be described by 2D spatial coordinates of a point at which the ray intersects a plane and by two angles (e.g., an azimuthal angle and an altitude angle).

A light field camera can capture light field information about light rays incident on a sensor plane of the camera: e.g., information about the angle and intensity of light rays incident at respective pixels of the sensor plane.

Thus, a light field camera, also called a plenoptic camera, is quite different from a conventional camera. A conventional camera can only measure the amount of light received at respective sensor pixels; it cannot measure the angle at which the illumination strikes the respective pixels. In contrast, a light field camera can measure both the amount and direction of light that strikes respective sensor pixels.

SUMMARY

In exemplary implementations of this invention, a light field camera includes lens, a coded spatial light modulator (SLM), and an imaging sensor. The coded SLM may comprise, for example, a mask, transparency, or liquid crystal display (LCD). Light from a scene passes through the lens, then passes through the coded SLM, and then arrives at the imaging sensor. The imaging sensor captures a photograph of the incident light. The SLM is positioned a short distance away from the imaging sensor.

One or more computer processors process data from the photograph to compute a light field. This processing involves computing a coefficient vector, such that $i=\Phi l=\Phi D\alpha$, where $i \in \mathbb{R}^m$ is the vectorized sensor image, $l \in \mathbb{R}^n$ is the vectorized light field incident on the imaging sensor, $\Phi$ is a measurement matrix that comprises information about a projection of the SLM modulated light unto the imaging sensor, $D \in \mathbb{R}^{n \times d}$ is a light field dictionary matrix, and $\alpha \in \mathbb{R}^d$ is a coefficient vector. Preferably: (a) the light field dictionary D is overcomplete; and (b) the coefficient vector $\alpha$ is sparse or compressible.

In exemplary implementations of this invention, each column vector of dictionary matrix D is a light field atom. These light field atoms each, respectively, comprise information about intensity, direction and spatial position of light rays in a small 4D region of a light field. For example, the light field atoms each, respectively, may comprise information about the radiance distribution of light rays impinging on a 2D spatial area (e.g., a small 2D spatial area of an imaging sensor plane) at different angles. For example, if a light ray impinges on a sensor pixel in a 4D light field atom: (a) spatial information included in the light field atom may specify the 2D spatial coordinates of the pixel; (b) angular information included in the light field atom may specify the direction of the light ray; and (c) intensity included in the light field atom may specify the radiance of the light ray.

Preferably, the light field atoms are normalized: i.e., each column vector of dictionary D is a unit vector. In many implementations, these column vectors are not mutually orthogonal to each other, and dictionary D is not an orthonormal basis. Alternatively, in some cases, the dictionary D is an orthonormal basis The processors may use one or more algorithms to calculate coefficient vector $\alpha$. Which algorithm(s) are used depends on the particular implementation of this invention. Here are some non-limiting examples of algorithms that can be used to reconstruct coefficient vector $\alpha$ from a photograph of the scene, using light field dictionary D: (1) a basis pursuit denoise algorithm, alone or together with a fast $l_1$ relaxed homotopy algorithm; (2) a basis pursuit algorithm; (3) a Lasso algorithm, (4) a matching pursuit algorithm, (5) an orthogonal matching pursuit algorithm, or (6) any other greedy algorithm. This is not an exhaustive list; other algorithms may be used for this purpose.

The light field dictionary D is learned from training light fields. The training light fields are 4D. For example, the training 4D light fields may have been captured by a prior art plenoptic camera. In a prototype of this invention, five training light fields, which included reflections, refractions, texture and occlusions, were used to learn the light field dictionary.

The processors may use coresets to reduce the size of the training light fields, and then use one or more algorithms to learn (that is, compute) the light field dictionary D. For example, the processors may use any of the following algorithms to learn dictionary D: a K-SVD algorithm, a nonnegative K-SVD algorithm, or online sparse coding. For example, the online sparse coding may be implemented using the open source software package SPAMS (http://spamsdevel.gforge.inria.fr).

Preferably, incoherence between the SLM and dictionary is optimized—that is, maximized, optionally subject to one or more constraints. The incoherence that is optimized is a measure of the angles between the column vectors of dictionary D and the row vectors of measurement matrix Φ. The closer these angles are to 90 degrees, the greater the incoherence. The incoherence would be total if each of the column vectors of dictionary D were orthogonal to each of the row vectors of measurement matrix Φ. Incoherence can also be expressed in terms of inner products, since the inner product of two vectors is zero if the two vectors are orthogonal.

For example, incoherence between the SLM and dictionary may be optimized by: (a) minimizing the sum of the inner products of the column vectors of dictionary D and the row vectors of measurement matrix Φ; (b) minimizing the Frobenius norm of vector spaces A and B, where A is a vector space consisting of the column vectors of dictionary D and B is a vector space consisting of the row vectors of measurement matrix Φ, (c) otherwise maximizing any measure of incoherence between the column vectors of dictionary D and the row vectors of measurement matrix Φ, or (d) making the SLM and dictionary as orthogonal to each other as possible. In each of these examples, the optimization may, optionally, be subject to one or more constraints. Or, for example, incoherence between the SLM and dictionary may be optimized pursuant to Equation 7 below.

In exemplary implementations of this invention, the light field camera uses a light field dictionary to reconstruct a 4D light field from a single photograph, where: (a) the 4D light field comprises both 2D spatial information and angular information about light rays in the light field; and (b) the 4D light field has a spatial resolution equal to the spatial resolution of the imaging sensor. This ability to reconstruct a 4D light field from a single photograph, with a spatial resolution equal to the spatial resolution of the imaging sensor, is an important advantage. Alternatively, in some implementations, the camera uses multiple photographs to reconstruct a light field.

The measurement matrix Φ may be, but is not necessarily, sparse or compressible.

The description of the present invention in the Summary and Abstract sections hereof is just a summary. It is intended only to give a general introduction to some illustrative implementations of this invention. It does not describe all of the details of this invention. This invention may be implemented in many other ways.

The above Figures show some illustrative implementations of this invention, or provide information that relates to those implementations. However, this invention may be implemented in many other ways. The above Figures do not show all of the details of this invention.

DETAILED DESCRIPTION

In exemplary implementations of this invention, a compressive light field camera recovers a high-resolution light field from a single image. To do so, the light field camera may use: (a) a light field dictionary matrix and coefficient vector to sparsely represent natural light fields, (b) an optical setup to capture optimized 2D light field projections, and (c) robust sparse reconstruction methods to recover a 4D light field from a single coded 2D projection. The optical system is optimized to provide incoherent measurements, thereby optically preserving the information content of light field atoms in the recorded projections and improving the reconstruction process.

Conventional, prior art, light field cameras trade spatial resolution for the ability to capture different views of a light field, oftentimes reducing the final image resolution by orders of magnitude compared to the raw sensor resolution. In contrast, exemplary embodiments of this invention can reconstruct a high resolution 4D light field (e.g., with a spatial resolution equal to the spatial resolution of the imaging sensor) from a single coded camera image.

Figure 1:
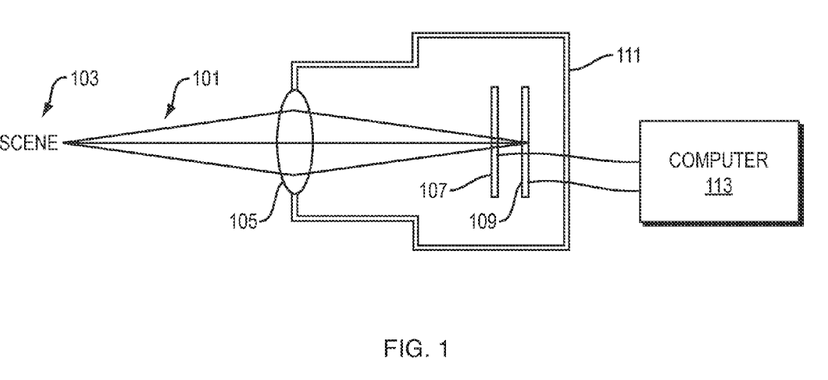
FIG. 1 shows a first example of an optical setup for a light field camera.
Figure 2:
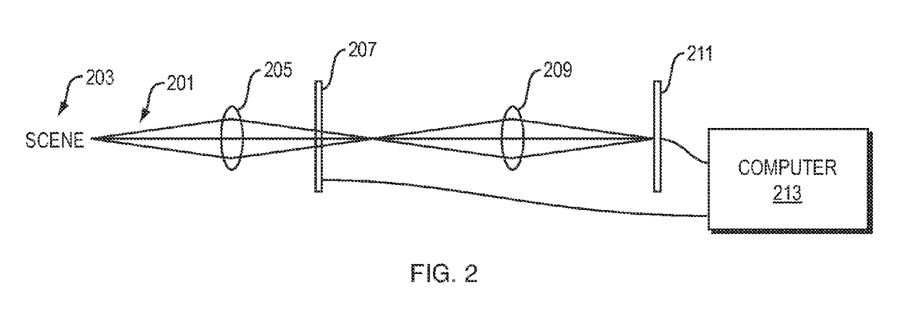
FIG. 2 shows a second example of an optical setup for a light field camera.
Figure 3:
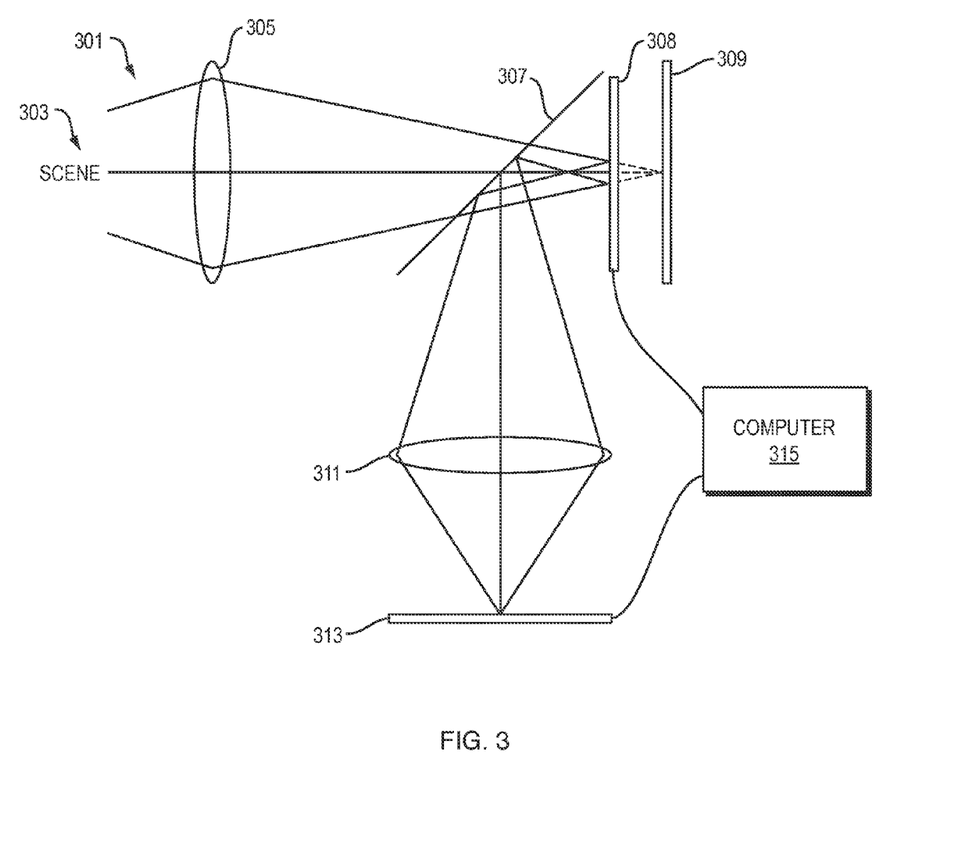
FIG. 3 shows a third example of an optical setup for a light field camera.

FIGS. 1, 2 and 3 shows three different examples of optical setups for a light field camera, in illustrative implementations of this invention. In each of these examples, a light field camera includes an imaging sensor (109, 211 or 313), a spatial light modulator (SLM) (107, 207 or 308) and an objective lens (105, 205, or 305). The objective lens (105, 205, or 305) focuses light rays (101, 201 or 301) from a scene (103, 203 or 303).

For example, the imaging sensor (109, 211 or 313) may comprise a CCD or CMOS sensor. Also, for example, the SLM (107, 207 or 308) may comprise a liquid crystal display (LCD), mask, transparency, or reflective liquid crystal on silicon (LCoS) display.

The proportion of light that passes through, or is reflected from, the SLM varies as a function of the spatial position at which incident light strikes the SLM. For example, if light passes through the SLM, then some areas of the SLM may be translucent, other areas of the SLM may be transparent, and other areas of the SLM may be opaque. Or, for example, if the light is reflected by the SLM, then some areas of the SLM may reflect a higher percentage of incident light than other areas of the SLM. Thus, the SLM spatially modulates the light from the scene, before the light reaches the imaging sensor. The coded modulation pattern of the SLM may be static or dynamic. For example, if multiple photographs are taken, the coded modulation pattern of the SLM may remain the same from frame to frame, or may change from frame to frame.

In FIG. 1, the imaging sensor 109, SLM 107 and objective lens 105 are all housed in a camera housing 111.

In FIGS. 2 and 3, a relay lens (209 or 311) relays light to the imaging sensor (211 or 313).

In FIG. 3, the optical setup includes a beam splitter 307, which is partially transmissive and partially reflective. For example, the beam splitter 307 may be 50% transmissive and 50% reflective, and may be a polarizing beam splitter. The objective lens 305 focuses light from the scene 303 a short distance optically in front of a reflective SLM 308, causing a virtual imaging sensor 309 to have an apparent position optically behind the reflective SLM 308.

In the examples shown in FIGS. 1, 2 and 3, the SLM is positioned a short distance optically in front of the rear focal point of the objective lens (105, 205, or 305).

Figure 4:
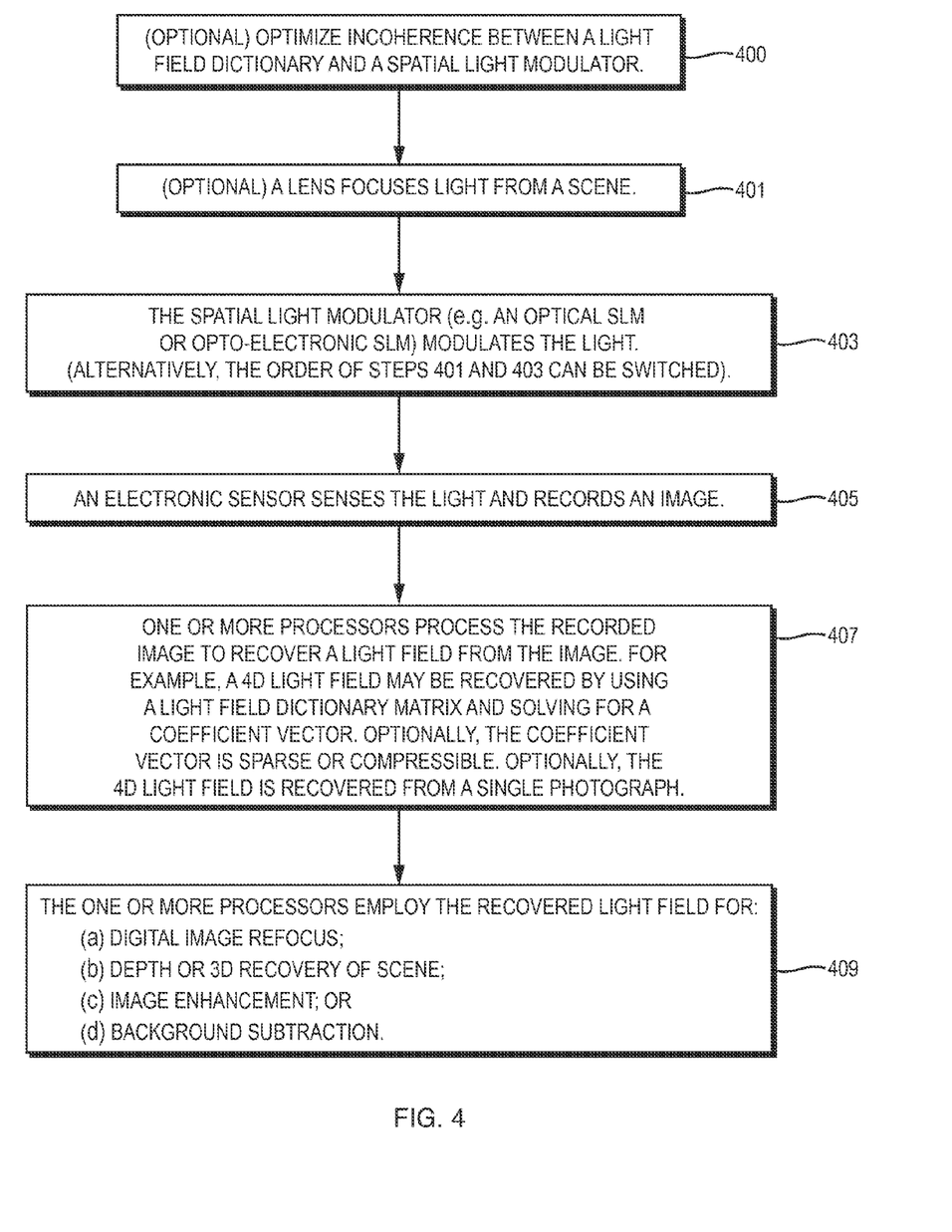
FIG. 4 is a flow chart of steps in a light field imaging method.

FIG. 4 is a flow chart of steps in a light field imaging method, in an exemplary implementation of this invention. In FIG. 4, the steps include: First, incoherence between a light field dictionary and a spatial light modulator is optimized. The optimization comprises maximizing this incoherence, optionally subject to one or more constraints. 400 Second, a lens focuses light from the scene. 401 Third, the SLM (e.g., an optical SLM or opto-electronic SLM) modulates the light. 403 Fourth, an electronic sensor measures the light and records an image. 405 Fifth, one or more processors process the recorded image to recover a 4D light field from the image. For example, a light field may be recovered by using a light field dictionary matrix and solving for a coefficient vector. Optionally, the coefficient vector is sparse or compressible. Optionally, the 4D light field is recovered from a single photograph. 407 Sixth, the one or more processors may employ the recovered light field for a variety of practical uses, including (a) digital image refocus, (b) depth or 3D recovery of a scene; (c) image enhancement, or (d) background subtraction. 409

Figure 5:
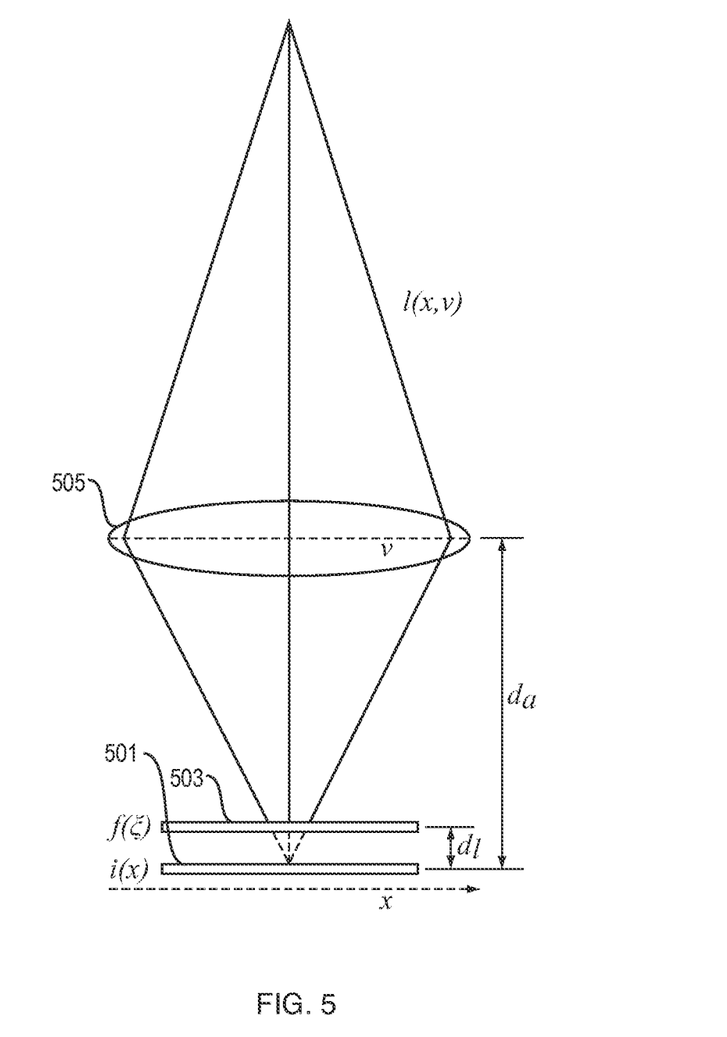
FIG. 5 shows a light field being imaged by a light field camera.

FIG. 5 shows a light field being imaged by a light field camera, in an exemplary implementation of this invention. In the example shown in FIG. 5, light from a scene is focused by the objective lens 505 and then passes through, and is modulated by an SLM 503. Then the modulated light travels to an imaging sensor 501.

In the example shown in FIG. 5, an image i(x) captured by a camera sensor i(x) is the projection of an incident spatio-angular light field l(x,v) along its angular dimension v over the aperture area v:

$$i(x)=\int_v l(x,v)dv \quad (1)$$

The light field l(x,v) can be described by a two-plane parameterization where x is the 2D spatial dimension on the sensor plane and v is the 2D position on the aperture plane at distance $d_a$. (See FIG. 5) For brevity of notation, the light field in Equation 1 absorbs vignetting and other angle-dependent factors.

In the example shown in FIG. 5, a coded SLM 503 is positioned at a distance $d_l$ from the sensor, which optically modulates the light field prior to projection as $$i(x)=\int_v f(x+s(v-x))l(x,v)dv \quad (2)$$

where $s=d_l/d_a$ is the shear of the SLM pattern with respect to the light field. (The spatial light attenuation pattern of an SLM is typically (but not always) a 2D spatial pattern. However, FIG. 5 is shown in "flatland" for clarity of presentation. Viewed in "flatland", the SLM pattern in FIG. 5 appears as a 1D code, and ξ a distance coordinate along the apparently 1D SLM plane.)

In discretized form, coded light field projection can be expressed as a matrix-vector multiplication:

$$i=\Phi l, \; \Phi=[\Phi_1,\Phi_2\ldots\Phi_{p_v^2}] \quad (3)$$

where $i\in\mathbb{R}^m$ and $l\in\mathbb{R}^n$ are the vectorized sensor image and light field, respectively. All $p_v \times p_v$ angular light field views $l_j$ (j=1 ... $p_v^2$) are stacked in l. Each submatrix $\Phi_j\in\mathbb{R}^{m\times m}$ is a sparse matrix containing the sheared mask code on its diagonal. For multiple recorded sensor images, the individual photographs and corresponding measurement matrices are stacked in i and Φ.

The observed image $$i = \sum_j \Phi_j l_j$$

sums the light held views, each multiplied with the same mask code and, optionally in some implementations, sheared by different amounts. If the mask is mounted directly on the sensor, the shear vanishes (s=0) and the views are averaged. If the mask is located in the aperture (s=1), the diagonals of each submatrix $\Phi_j$ become constants which results in a weighted average of all light field views. In this case, however, the angular weights do not change over the sensor area.

In practice, the most random, or similarly incoherent, sampling of different angular samples happens when the mask is located between sensor and aperture.

Equations 1-3 model a captured sensor image as the angular projection of the incident light field. These equations can be interpreted to either describe the entire sensor image or small neighborhoods of sensor pixels—2D patches—as the projection of the corresponding 4D light field patch. Sparsity priors discussed below can exclusively operate on such small two-dimensional and four-dimensional patches.

The inverse problem of reconstructing a light field from a coded projection requires a linear system of equations (Eq. 3) to be inverted. For a single sensor image, the number of measurements is significantly smaller than the number of unknowns, i.e. m<<n. In exemplary implementations of this invention, sparse coding techniques may be used to solve the underdetermined problem.

In exemplary implementations of this invention, one or more computer processors process data from the photograph to compute a light field. This processing involves computing a coefficient vector using a light field dictionary matrix, such that $$i=\Phi l=\Phi D\alpha \quad (4)$$

where $i\in\mathbb{R}^m$ is the vectorized sensor image, $l\in\mathbb{R}^n$ is the vectorized light field incident on the imaging sensor, Φ is a measurement matrix, $D\in\mathbb{R}^{n\times d}$ is a light field dictionary matrix, and $\alpha\in\mathbb{R}^d$ is a coefficient vector.

The measurement matrix Φ mathematically describes how light rays of the light field map (or project) on the imaging sensor. Thus, in exemplary implementations: (a) the measurement matrix Φ is a mathematical representation of the camera optics, including the SLM; (b) the measurement matrix Φ includes information about the SLM; and (c) the measurement matrix Φ comprises information about a projection of the SLM modulated light unto the imaging sensor. In many, but not all, implementations, the measurement matrix Φ does not include information specific to the scene being imaged, but rather is determined by the optical setup of the camera, including the SLM.

The light field dictionary D may be, but is not necessarily, overcomplete. The coefficient vector α may be, but is not necessarily, sparse or compressible. The measurement matrix Φ may be, but is not necessarily, sparse or compressible.

In exemplary implementations of this invention, each column vector of dictionary matrix D is a light field atom. These light field atoms each, respectively, comprise information about a small 4D region of the light field—that is, intensity, angular and spatial information about light incident on a small 2D spatial area of the sensor plane. Preferably, this small 2D spatial area comprises no more than 25% of the total area of the imaging sensor. For example, in a prototype of this invention, each 4D light field atom comprises information regarding the angle, spatial position and radiance of light incident on a small area that surrounds a single pixel of the sensor screen. However, this invention is not limited to any particular size of light field atom; depending on the particular implementation, the size of a light field atom may vary. For a light ray that impinges on a sensor pixel in a 4D light field atom: (a) spatial information included in the light field atom may specify the 2D spatial coordinates of the pixel; (b) angular information included in the light field atom may specify the direction of the light ray; and (c) intensity information included in the light field atom may specify the radiance of the light ray.

Preferably, the light field atoms are normalized: i.e., each column vector of dictionary D is a unit vector. In many implementations, these column vectors are not mutually orthogonal to each other, and dictionary D is not an orthonormal basis. In some implementations, however, the dictionary D is an orthonormal basis.

The processors may use one or more algorithms to calculate coefficient vector α. Which algorithm(s) are used depends on the particular implementation of this invention. Here are some non-limiting examples of algorithms that can be used to reconstruct coefficient vector α from a photograph of the scene, using light field dictionary D: (1) a basis pursuit denoise algorithm, alone or together with a fast $l_1$ relaxed homotopy algorithm; (2) a basis pursuit algorithm; (3) a Lasso algorithm, (4) a matching pursuit algorithm, (5) an orthogonal matching pursuit algorithm, or (6) any other greedy algorithm. This is not an exhaustive list; other algorithms may be used for this purpose.

For example, the processors may reconstruct the light field by solving a Lagrangian formulation of a basis pursuit denoise problem:

$$\underset{\{\alpha\}}{\text{minimize}} \|i - D\alpha\|_2 + \lambda \|\alpha\|_1 \quad (5)$$

where λ is a parameter chosen to specify a tradeoff between (i) sparsity and (ii) error or a data fitting term.

In exemplary implementations, in order to reconstruct a light field, one or more processors solve an underdetermined system by computing the sparsest coefficient vector α that satisfies the measurements, i.e. the $l_2$-norm of the residual is smaller than the sensor noise level ϵ. Equation 5 is not constrained to penalize negative values in the reconstructed light field l=Dα. However, the inventors have not observed any resulting artifacts in practice.

An advantage of using light field atoms is that they are easily scalable: instead of attempting to solve a single, large optimization problem, many small and independent problems may be solved in parallel—one for each sensor pixel.

In exemplary implementations of this invention, a small 4D light field patch is reconstructed from a 2D image patch centered at each sensor pixel, respectively. For example, each respective 4D patch may comprise information about light rays impinging on an 11×11 pixel area in the sensor plane. During reconstruction, the processors employ a "sliding window" approach, in which different patches center about different sensor pixels. For example, a first patch may center about a first sensor pixel, a second patch may center about a second sensor pixel, and so on. Thus, loosely speaking, the "window" slides from patch to patch. The recovered light field patches are merged into a single reconstruction. Performance is optimized through parallelization and quick convergence of each subproblem; the reconstruction time grows linearly with increasing sensor resolution. Light field atoms can be used to model local spatio-angular coherence in the 4D light field sparsely.

The light field dictionary D is learned (computed) from training light fields. For example, the training light fields may be 4D light fields captured by a prior art plenoptic camera. In a prototype of this invention, five training light fields, which included reflections, refractions, texture and occlusions, were used to learn the dictionary.

In practice, training sets for the dictionary learning process are extremely large and often contain a lot of redundancy. In many cases, it is preferable to preprocess the training sets by extracting coresets.

In exemplary implementations of this invention, computer processors extract coresets to reduce the size of large training light fields, thereby making dictionary learning methods more efficient. For example, the processors may extract a coreset $C \in \mathbb{R}^{n \times c}$ from a training set $L \in \mathbb{R}^{n \times q}$, and then use the coreset as a surrogate training set for the dictionary learning process. Coresets have two advantages: first, the size of the training set is significantly reduced (i.e., c<<q) and, second, redundancies in the training set are removed, significantly improving convergence rates of batch-sequential algorithms such as online sparse coding. For example, the computer processors may compute a corset by selecting c patches of the training set that have a sufficiently high variance After this optional preprocessing step, the computer processors may use one or more algorithms to learn (that is, compute) the light field dictionary D. Preferably, the dictionary is overcomplete.

In exemplary implementations of this invention, the processors randomly select, from the training light fields, a large set of 4D spatio-angular light field patches, each 4D light field patch being of size $n = p_x \times p_x \times p_v \times p_v$.

For example, in a prototype of this invention, computer processors randomly selected a set consisting of more than a million overlapping patches from each of five training light fields. Each patch had a spatial resolution of 11×11 pixels and an angular resolution of 5×5. The computer processors then extracted coresets to reduce this set of patches to a tractable size of 50,000 patches.

The computer processors use the selected light patches (optionally, after preprocessing with coresets) to learn dictionary D. Depending on the particular implementation, a wide variety of algorithms may be employed for this purpose. For example, the processors may learn the dictionary from the training sets using: a K-SVD algorithm, a nonnegative K-SVD algorithm, or online sparse coding. For example, the online sparse coding may be implemented using the open source software package SPAMS (http://spamsdevel.gforge.inria.fr).

In some implementations, the one or more computer processor learn the dictionary from the training sets by performing the following optimization:

$$\underset{\{D,A\}}{\text{minimize}} \|L - DA\|_F \quad (6)$$

$$\text{subject to } \forall j, \|\alpha_j\|_0 \leq k$$

where $L = \mathbb{R}^{n \times q}$ is a training set comprised of q light field patches and $A = [\alpha_1, \ldots, \alpha_q] \in \mathbb{R}^{d \times q}$ is a set of k-sparse coefficient vectors. (A signal is said to be k-sparse, if the signal has at most k nonzero coefficients). The Frobenius matrix norm in Equation 6 is $$\|X\|_F^2 = \sum_{ij} x_{ij}^2,$$

the $l_0$ pseudo-norm counts the number of nonzero elements in a vector, and k (k<<d) is the sparsity level being enforced.

The size of light field atoms is an important design parameter. Consider a 4D light field atom with $n = p_x^2 \times_v^2$ pixels. The number of measurements m per photograph for that atom is $m = p_x^2$. If the dictionary D has a constant sparseness k, then the number of measurements m typically follows the general rule m≥O(k log(d/k)), where k is the sparsity level being enforced and d is the number of columns of D. As the spatial size of a light field atom is increased for a fixed angular size and overcompleteness, the recovery problem becomes more well-posed because m grows linearly with the atom size, whereas the right hand side only grows logarithmically because d is directly proportional to n. On the other hand, an increasing atom size may decrease light field compressibility due to reduced local coherence within the atoms.

In heuristic experiments, the inventors found that $p_x=11$ is a good light field atom size for some applications of a prototype of this invention.

Furthermore, in heuristic experiments, the inventors found that 1–2×overcomplete dictionaries adequately represented a particular training set while providing a good tradeoff between sparsity and dictionary size; such that all atoms have a resolution of 5×20 in angle and space.

In exemplary implementations of this invention: (a) one or more processors perform a reconstruction algorithm for each light field atom separately, and then combine the results, and the separate reconstructions for the separate light field atoms are computed in parallel; (b) each of the light field atoms comprises (i) intensity, angular and spatial information regarding one or more light rays impinging on a 2D spatial region, or (ii) information regarding the absence of any light rays impinging on the 2D spatial region; and (c) the 2D spatial region for any given light field atom centers on a single pixel in the imaging sensor. In some implementations, each respective light field atom has such a 2D spatial region which overlaps in part, but not entirely, with the 2D spatial region(s) of one or more other light field atoms in the light field dictionary. In other implementations, each respective light field atom has such a 2D spatial region that (i) does not overlap with the 2D spatial region(s) of any other light field atoms in the light field dictionary, and (ii) is adjacent to (abuts) the 2D spatial region(s) of one or more other light field atoms in the light field dictionary.

Depending on the particular implementation, the SLM pattern may vary. For example, in some implementations, the SLM patterns are tiled broadband codes, or random (e.g., Gaussian) patterns.

Preferably, projections of higher-dimensional signals should be as orthogonal as possible in the lower-dimensional projection space. Poor choices of codes would allow high-dimensional signals to project onto the same measurement, whereas optimal codes remove such ambiguities as best as possible.

Preferably, incoherence between the SLM and dictionary is optimized—that is, maximized, optionally subject to one or more constraints. The incoherence that is optimized is a measure of the angles between the column vectors of dictionary D and the row vectors of measurement matrix $\Phi$. The closer these angles are to 90 degrees, the greater the incoherence. The incoherence would be total if each of the column vectors of dictionary D were orthogonal to each of the row vectors of measurement matrix $\Phi$. Incoherence can also be expressed in terms of inner products, since the inner product of two vectors is zero if the two vectors are orthogonal.

For example, incoherence between the SLM and dictionary may be optimized by: (a) minimizing the sum of the inner products of the column vectors of dictionary D and the row vectors of measurement matrix $\Phi$; (b) minimizing the Frobenius norm of vector spaces A and B, where A is a vector space consisting of the column vectors of dictionary D and B is a vector space consisting of the row vectors of measurement matrix $\Phi$; (c) otherwise maximizing any measure of incoherence between the column vectors of dictionary D and the row vectors of measurement matrix $\Phi$; or otherwise making the SLM and dictionary as orthogonal to each other as possible. In each of these examples, the optimization may, optionally, be subject to one or more constraints.

Or, for example, incoherence between the SLM and dictionary may be optimized as follows $$\underset{\{f\}}{\text{minimize}} \|I - G^T G\|_F \qquad (7)$$

$$\text{subject to } 0 \leq f_i \leq 1, \forall i$$

$$\sum_i f_i / m \geq \tau$$

where G is $\Phi$D with normalized columns and $f \in \mathbb{R}^m$ is the mask pattern along the diagonals of the submatrices in $\Phi$.

Each column of G is the normalized projection of one light field atom into the measurement basis. The individual elements of $G^T G$ are inner products of each of these projections, hence measuring the distance between them. Whereas diagonal elements of $G^T G$ are always one, the off-diagonal elements correspond to mutual distances between projected light field atoms. To maximize these distances, the objective function attempts to make $G^T G$ as close to identity as possible. To further optimize for light efficiency of the system, Equation 7 further includes an additional constraint $\tau$ on the mean light transmission of the SLM code f.

Depending on the particular implementation, the steps taken to maximize incoherence between the SLM and light field dictionary may vary. For example, given a specific dictionary, a computer may compute which SLM pattern, out of a set of different SLM patterns, maximizes this incoherence. Or, for example, given a specific SLM pattern, a computer may compute a light field dictionary in such a way as to maximize this incoherence. Or, for example, a computer may perform computations to determine which combination of a SLM pattern and a dictionary (out of multiple different combinations of one or more SLM patterns and one or more different dictionaries) would result in the greatest incoherence between the SLM and the light field dictionary.

As used herein, an "Optimized SLM" with respect to a light field dictionary means either: (a) a SLM that is optimized to be maximally incoherent with respect to the light field dictionary, optionally subject to one or more constraints; or (b) an SLM which modulates light that is projected on an imaging sensor, such that the projection is optimized to be maximally incoherent with respect to the light field dictionary. For example, the optimization may comprise changing a spatial light attenuation pattern of the SLM. Or, for example, the optimization may comprise selecting a SLM, out of a set of SLMs, such that the spatial light attenuation pattern of the selected SLM is more incoherent with respect to the light field dictionary than the spatial light attenuation patterns of the other SLMs in the set.

In exemplary implementations of this invention, a 4D light field may be reconstructed from a single photograph. However, in some implementations, the reconstruction may use multiple photographs. Initial tests of a prototype of this invention indicate that more photographs increase the quality of the reconstructed light field, as measured by peak signal-to-noise ratio (PSNR). After a certain number of exposures, reconstruction quality is not significantly increased further.

In most implementations of this invention: (a) no scene specific data is in the measurement matrix; and (b) the measurement matrix is only dependent on the optics and the SLM, not the scene being imaged.

The following is a description of a prototype of this invention:

The prototype has the same general optical configuration as that shown in FIG. 3, with a reflective SLM 308. The reflective SLM 308 comprises a liquid crystal on silicon (LCoS) display (SiliconMicroDisplay™ ST1080). The LCoS acts as a mirror where each pixel can independently change the polarization state of incoming light. In conjunction with a polarizing beam splitter 307 and relay lens 311, as shown in FIG. 3, the optical system emulates an attenuation mask mounted at an offset in front of the sensor.

In the optical setup of this prototype, a single pixel on the LCoS cannot be well resolved. Thus, blocks of 4×4 LCoS pixels are treated as macropixels, resulting in a mask resolution of 480×270. The SLR camera lens (Nikon® 105 mm f/2.8 D) is not focused on the LCoS but optically in front of it, thereby optically placing the (virtual) image sensor behind the LCoS plane. A Canon® EF 50 mm f/1.8 II lens is used as the imaging lens and focused at a distance of 50 cm; scenes are placed within a depth range of 30-100 cm. The f-number of the system is the maximum of both lenses (f/2.8).

In this prototype, the distance $d_l$ between the SLM (LCoS plane) and the virtual image sensor is adjusted by changing the focus of the SLR camera lens. The prototype can capture light fields with $p_v \times p_v$ angular resolution (e.g., $p_v=5$). While the prototype images a white calibration object, the LCoS displays a pinhole array where adjacent pinholes are $p_v$ macropixels apart. Then the focus of the SLR camera lens is adjusted so that disc-shaped blurred images under the pinholes almost abut each other. In this way, angular light field samples impinging on each sensor pixel pass through distinct macropixels on the LCoS with different attenuation values before getting integrated on the sensor.

This prototype captures mask-modulated light field projections by displaying a pattern on the LCoS macropixels and resizing the sensor images accordingly.

For the dictionary learning stage, a variety of scenes were captured using a traditional pinhole array. For this purpose, $p_v \times p_v$ (=25) images are recorded with shifting pinholes on the LCoS to obtain full-resolution light fields.

In this prototype, the measurement matrix $\Phi$ is measured by capturing the light field of a uniform white cardboard scene modulated by the mask pattern. This scene is captured in multiple shots with a shifting pinhole array on the LCoS, where each pinhole is additionally modulated by the corresponding SLM value. The measurement matrix only has to be captured once for a particular SLM in a particular optical setup.

In this prototype light, (a) an optical relay system emulates a spatial light modulator (SLM) mounted at a slight offset in front of the sensor, and (b) a reflective LCoS is used as the SLM. Such an optical arrangement is shown in FIG. 3.

In this prototype, the algorithmic framework is a two-step process involving an offline dictionary learning stage and a nonlinear reconstruction.

In this prototype, dictionary learning is performed as follows: five training light fields are captured with an aperture setting of approx. 0.5 cm (f/2.8). Computer processors randomly extract more than one million 4D light field patches, each with a spatial resolution of 11×11 pixels and 5×5 angular samples. After applying coreset reduction, 50,000 remaining patches are used to learn a 1.7×overcomplete dictionary consisting of 5,000 light field atoms. The memory footprint of this learned dictionary is about 111 MB. Sparse Modeling Software is used to learn this dictionary on a workstation equipped with a 24-core Intel® Xeon® processor and 200 GB RAM in about 10 hours.

In this prototype, the measurement matrix $\Phi$ is measured by capturing the light field of a white cardboard scene modulated by the SLM pattern. A shifting pinhole array is used to measure the measurement matrix $\Phi$. However, rather than making each pinhole fully open (1.0) as in the case of training light field capture, each pinhole is assigned a corresponding value ($\epsilon[0,1]$) in the SLM. The inventors observed that the actual attenuation introduced by the LCoS was greater than the specified SLM value. To compensate for this non-linearity, an assumed gamma curve relationship between LCoS pixel values and actual attenuations was assumed, and the compute processors performed linear search for the optimal gamma value for each color channel to obtain expected attenuation ratios.

In this prototype, the light field camera is implemented in a compact form factor with a static attenuation mask. The static mask comprises: (a) a film with a mask pattern (which pattern, in some cases, is random); and (b) a mask holder that fits into the sensor housing of a Lumenera® Lw11059 monochrome camera, and is configured to hold the film mask. The printer which prints the film pattern can print with 25 μm resolution. A mask resolution of 50 μm is chosen, which roughly corresponds to 6×6 pixels on the sensor. Computer processors downsample the sensor image by 6, and crop out the center 200×160 region in order to avoid mask holder reflection and vignetting. The distance between the mask and the sensor is 1.6 mm. A Canon® EF 50 mm f/1.8 II lens is used and focused at a distance of 50 cm. An aperture-based light field capture method is used to calibrate the measurement matrix $\Phi$.

In this prototype, five training sets are captured. Each light field in the training set has a resolution of 480×270 pixels in space and 5×5 views. Processors randomly extract 360,000 overlapping patches from each of the training light fields. Each patch has a spatial resolution of 11×11 pixels and an angular resolution of 5×5. A coreset technique is used (a) to increase variability amongst these extracted patches; and (b) to reduce this set to tractable size of about 50,000 patches. This process is repeated for all of the training light fields to generate a training set of about 250,000 patches. Coresets are again applied to reduce the final training set to about 50,000 patches.

In this prototype, a light field is reconstructed with 5×5 views from a single sensor image with a resolution of 480×270 pixels. For this purpose, the coded sensor image is divided into about 120,000 overlapping 2D patches, each with a resolution of 11×11 pixels per color channel, by centering a sliding window around each sensor pixel. Subsequently, a small 4D light field patch is recovered for each of these windows. The reconstruction is performed in parallel on an 8-core Intel® i7 workstation with 16 GB RAM. The processors employ a fast $l_1$-relaxed homotopy method with sparsity penalizing parameter $\lambda$ set to 10, tolerance to 0.001 and iterations to be 10,000. Reconstructions for three color channels take about 18 hours for a light field. The reconstructed overlapping 4D patches are merged with a median filter.

In this prototype, for correct minimization of the L1 norm, computer processors at each step normalize the product of the calibrated measurement matrix and the dictionary. Each light field patch takes about 0.1 seconds to be recovered, resulting in runtime of about 18 hours for all three color channels on an 8-core Intel® i7 machine with 16 GB of memory. Each patch is independent of all other patches. Hence, the reconstruction can be easily parallelized and significantly accelerated with modern high-end GPUs that have up to thousands of cores or cloud-based infrastructures.

In this prototype, light fields are captured with a compressive light field camera and reconstructed from a single sensor image. This single sensor image is a coded projection of the light field. 4D light fields can be recovered from a single 2D sensor image.

Alternately, multiple 4D light fields may recovered from multiple 2D sensor images, one light field per 2D sensor images. Thus, a sequence of multiple frames of a light field may be reconstructed. Dynamic or animated events can be recovered this way.

This invention is not limited to the above-described prototype. Instead, this invention can be implemented in many different ways.

In exemplary implementations of this invention, one or more electronic processors are specially adapted: (1) to control the operation of hardware components of a light field camera, including any SLM, any imaging sensor, any actuator for moving a diaphragm or otherwise changing aperture size, and any actuator for changing focal length; (2) to perform calculations to learn a light field dictionary from a training set of light fields; (3) to perform calculations to calculate a measurement matrix; (4) to perform computations to reconstruct a light field from a single photograph (or, in some cases, multiple photographs), which reconstruction computations may include using a light field dictionary to help recover a sparse or compressible coefficient vector; (5) to receive signals indicative of human input, (6) to output signals for controlling transducers for outputting information in human perceivable format, and (7) to process data, perform computations, and control the read/write of data to and from memory devices. The one or more processors may be located in any position or position within or outside of the light field camera. For example: (a) at least some of the one or more processors may be embedded within or housed together with other components of the light field camera, such as the imaging sensor, and (b) at least some of the one or more processors may be remote from other components of the light field camera. The one or more processors may be connected to each other or to other components in the light field camera either: (a) wirelessly, (b) by wired connection, or (c) by a combination of wired and wireless connections. For example, one or more electronic processors (e.g., 113, 213 or 315 in FIG. 1, 2, or 3) may be housed in a computer.

Four ASCII text files are listed in the Computer Program Listing above. The reconstructLightField.txt file comprises code for a Matlab® script file (.m file) for reconstructing a light field. The drawLightField4D.txt file comprises code for a Matlab® function file (.m file) that: (1) is called by the reconstructLightField program, and (2) draws a light field. The animateLightField.txt comprises code for a Matlab® function file (.m file) that: (1) is called by the reconstructLightField program, and (2) creates an animated light field. The learnDictionary.txt file comprises code for a Matlab® script file (.m file) for learning a light field dictionary. This invention is not limited to the software set forth in these four ASCII text files. Depending on the particular implementation, the software used in this invention may vary.

DEFINITIONS

Here are a few definitions and clarifications. As used herein:

The terms "a" and "an", when modifying a noun, do not imply that only one of the noun exists.

To say that a vector or matrix is "compressible" means that at least 95% of the elements of the vector or matrix are zero or close to zero. For purposes of the preceding sentence, a specific element in a vector or matrix is "close to zero" if and only if the magnitude of that specific element is less than or equal to a number, which number is ten times the median magnitude of the elements in the vector or matrix.

The term "comprise" (and grammatical variations thereof) shall be construed broadly, as if followed by "without limitation". If A comprises B, then A includes B and may include other things.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

In the context of a camera (or components of the camera), "front" is optically closer to the scene being imaged, and "rear" is optically further from the scene, during normal operation of the camera. In the context of a display device (or components of the display device), "front" is optically closer to a human viewer, and "rear" is optically further from the viewer, when the viewer is viewing a display produced by the device during normal operation of the device. The "front" and "rear" of a display device continue to be the front and rear, even when no viewer is present.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

To say that a vector or matrix is "k-sparse" means that there are k non-zero elements in the vector or matrix.

The term "light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

A "light field", also called a "light field function", means a mathematical description of intensity, spatial position and direction of light rays in a region. Typically, in practice, a light field does not describe all light rays actually faring in a physical region, but instead describes a finite subset of such light rays.

"Light field atom" means a vector that comprises information about (1) the intensity, spatial position and angular orientation of one or more light rays in a region, or (2) the absence of light rays in the region. For example, the intensity information may comprise information about radiance.

"Light field dictionary", also called a "light field dictionary matrix", means a matrix, in which either: (a) the columns are light field atoms, or (b) the rows are light field atoms.

"Light field information" means information that specifies spatial position, direction and intensity of a single light ray or of a set of light rays.

The term "matrix" includes a matrix that has two or more rows, two or more columns, and at least one non-zero entry. The term "matrix" also includes a vector that has at least one non-zero entry and either (a) one row and two or more columns, or (b) one column and two or more rows. However, as used herein, (i) a scalar is not a "matrix", and (ii) a rectangular array of entries, all of which are zero (i.e., a so-called null matrix), is not a "matrix".

To "multiply" includes to multiply by an inverse. Thus, to "multiply" includes to divide.

An "Optimized SLM" with respect to a light field dictionary means either: (a) a SLM that is optimized to be maximally incoherent with respect to the light field dictionary, optionally subject to one or more constraints; or (b) an SLM which modulates light that is projected on an imaging sensor, such that the projection is optimized to be maximally incoherent with respect to the light field dictionary. For example, the optimization may comprise changing a spatial light attenuation pattern of the SLM. Or, for example, the optimization may comprise selecting a SLM, out of a set of SLMs, such that the spatial light attenuation pattern of the selected SLM is more incoherent with respect to the light field dictionary than the spatial light attenuation patterns of the other SLMs in the set.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

To compute a term that "satisfies" an equation: (a) does not require that calculations involve terms, variables or operations that are in the equation itself, as long as the term itself (subject to error, as described in part (b) of this sentence) is computed; and (b) includes computing a solution that differs from a correct solution by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a so-called empty set (i.e., a set with no elements).

A "spatial light modulator", also called an "SLM", is a device that (i) either transmits light through the device or reflects light from the device, and (ii) attenuates such light, such that the amount of attenuation of a light ray incident at a point on a surface of the device depends on at least the 2D spatial position of the point on the surface.

To say that a vector or matrix is "sparse" means that 95% or more of the elements of the vector or matrix are zero.

As used herein, a "subset" of a set consists of less than all of the elements of the set.

The term "such as" means for example.

A matrix may be indicated by a bold capital letter (e.g., D). A vector may be indicated by a bold lower case letter (e.g., $\alpha$).

However, the absence of these indicators does not indicate that something is not a matrix or not a vector.

A "Defined Term" means a term that is set forth in quotation marks in this Definitions section. Applicant is acting as his, her or its own lexicographer for the Defined Terms. This Definitions section shall, in all cases, control over and override any other definition of the Defined Terms. For example, the definitions of Defined Terms set forth in this Definitions section override common usage or any external dictionary.

This document (except for the definition of "light field dictionary" itself) is drafted with the assumption that the columns of the light field dictionary matrix are light field atoms. However, this invention includes implementations in which the rows (instead of the columns) of the light field dictionary matrix are light field atoms. For implementations in which the light field atoms are rows of light field dictionary D, the claims and the above description of this invention shall be treated as having been modified as follows: every time that light field dictionary (or the symbol D) appears, replace it with the transpose of the light field dictionary (or $D^T$). For example: (a) if the columns of the light field dictionary are light field atoms, then Equation 1 is in the form $i=\Phi l=\Phi D\alpha$, as discussed above; and (b) if instead, the rows of the light field dictionary are light field atoms, then Equation 1 shall be treated as being in the form $i=\Phi l=\Phi D^T\alpha$. Also, for example, in the discussion of incoherence: (a) if the columns of the light field dictionary are light field atoms, then incoherence between the columns of the light field dictionary D and the rows of the SLM can be optimized, as discussed above; and (b) if instead, the rows of the light field dictionary are light field atoms, then incoherence between the columns of $D^T$ and the rows of the SLM can be optimized. However, nothing in this paragraph affects the definition of "light field dictionary" itself. More generally: (a) references to the rows of a specific matrix also apply to the columns of the transpose of the specific matrix; and (b) references to the columns of a specific matrix also apply to the rows of the transpose of the specific matrix.

VARIATIONS

This invention may be implemented in many different ways, in addition to those described above.

Here are some non-limiting examples of how this invention may be implemented:

This invention may be implemented as a light field camera that captures light field functions with more than four dimensions.

This invention may be implemented as a method comprising, in combination: (a) using an imaging sensor to take measurements of light from a first scene, which light has, after leaving the first scene, passed through or been reflected from a SLM; and (b) using one or more computer processors to use the measurements of the light as inputs to perform calculations to compute a first light field function of the light; wherein the calculations include multiplying a light field dictionary matrix or multiplying a light field atom in the light field dictionary matrix, which light field dictionary matrix has, before the imaging sensor takes the measurements, been computed from training sets, which training sets comprise or were extracted from light field functions of light from other scenes, the first scene being at least partially different in appearance than the other scenes. Furthermore: (1) in some cases, the light field function has a first spatial resolution, the imaging sensor has a second spatial resolution, the first and second spatial resolutions are equal, the measurements are taken during a single exposure, and the calculations do not use, as inputs, any sensor readings by the imaging sensor during any exposure other than the single exposure, except to the extent, if any, that any prior sensor readings by the imaging sensor affect any information contained in the light field dictionary or affect any information, not specific to the first scene, contained in any measurement matrix; (2) the calculations may further include computing a coefficient vector $\alpha \in \mathbb{R}^d$ that satisfies an equation $i = \Phi l = \Phi D\alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the first light field function, and $\Phi$ is a matrix that comprises information about a projection of light, modulated by the SLM, unto the imaging sensor; (3) in some cases, the light field dictionary is not square; (4) in some cases, the light field dictionary is not an orthonormal basis; (5) the SLM may be an Optimized SLM with respect to the light field dictionary matrix; (6) the coefficient vector $\alpha$ may be sparse or compressive; (7) a first light field atom in the light field dictionary matrix may comprise information about one or more light rays, or absence of light rays, in a first spatial region, a second light field atom in the light field dictionary matrix may comprise information about one or more light rays, or absence of light rays, in a second spatial region, and the first and second spatial regions may partially overlap each other; and (8) the calculations may include a first computation of light field information for a first spatial area, and may also include a second computation of light field information for a second spatial area, the first and second spatial areas being different, but not necessarily disjoint, sets of points, and the first and second computations may be performed in parallel.

This invention may be implemented as a method comprising, in combination: (a) using an imaging sensor to take measurements of light that has passed through or been reflected from a SLM; and (b) using one or more computer processors to perform calculations to compute a light field function of light incident on the imaging sensor; wherein the calculations include (i) multiplying a light field dictionary matrix or multiplying a light field atom in the light field dictionary matrix, and (ii) computing a coefficient vector $\alpha \in \mathbb{R}^d$ that satisfies an equation $i = \Phi l = \Phi D\alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ a matrix that comprises information about a projection of light, modulated by the SLM, unto the imaging sensor. Furthermore: (1) the SLM may be an Optimized SLM with respect to the light field dictionary matrix; (2) in some cases, the light field dictionary is not an orthonormal basis; (3) the imaging sensor may detect light during multiple exposures, and the one or more processors may use data collected by the imaging sensor during the multiple exposures to compute a light field function; (4) a first light field atom in the light field dictionary matrix may comprise information about one or more light rays, or absence of light rays, in a first spatial region, a second light field atom in the light field dictionary matrix may comprise information about one or more light rays, or absence of light rays, in a second spatial region, and the first and second spatial regions may partially overlap each other; and (5) the calculations may include a first computation of light field information for a first spatial area, and may also include a second computation of light field information for a second spatial area, the first and second spatial regions may partially overlap each other, and the first and second computations may be performed in parallel.

This invention may be implemented as apparatus comprising, in combination: (a) a SLM; (a) an imaging sensor configured to detect light that has passed through, or been reflected by, the SLM; and (b) one or more computer processors configured to perform calculations to compute a light field function of light incident on the imaging sensor; wherein the calculations include multiplying a light field dictionary matrix or multiplying a light field atom in the light field dictionary matrix. Furthermore: (1) the SLM may be an Optimized SLM with respect to the light field dictionary matrix; (2) the calculations may further include computing a coefficient vector $\alpha \in \mathbb{R}^d$ that satisfies an equation $i = \Phi l = \Phi D\alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ is a matrix that comprises information about a projection of light, modulated by the SLM, unto the imaging sensor; (3) in some cases, the light field dictionary is not an orthonormal basis; and (4) the calculations may include separate computations of light field information, each computation being for a different spatial area, none of which spatial areas overlap each other, and the separate computations may be performed in parallel.

CONCLUSION

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention. Numerous modifications may be made by one of ordinary skill in the art without departing from the scope of the invention.

What is claimed is:
1. A method comprising, in combination:
   (a) using an imaging sensor to take measurements of light from a first scene, which light has, after leaving the first scene, passed through or been reflected from a SLM; and
   (b) using one or more computer processors to use the measurements of the light as inputs to perform calculations to compute a first light field function of the light;
   wherein
      (i) the calculations include multiplying a light field dictionary matrix or multiplying a light field atom in the light field dictionary matrix, which light field dictionary matrix has, before the imaging sensor takes the measurements, been computed from training sets, which training sets comprise or were extracted from light field functions of light from other scenes, the first scene being at least partially different in appearance than the other scenes,
      (ii) the first light field function has a first spatial resolution, the imaging sensor has a second spatial resolution, and the first and second spatial resolutions are equal,
      (iii) the measurements are taken during a single exposure, and
      (iv) the calculations do not use, as inputs, any sensor readings by the imaging sensor during any exposure other than the single exposure, except to the extent, if any, that any prior sensor readings by the imaging sensor affect any information contained in the light field dictionary or affect any information, not specific to the first scene, contained in any measurement matrix.

2. A method comprising, in combination:
(a) using an imaging sensor to take measurements of light from a first scene, which light has, after leaving the first scene, passed through or been reflected from a SLM; and
(b) using one or more computer processors to use the measurements of the light as inputs to perform calculations to compute a first light field function of the light;
wherein
   (i) the calculations include multiplying a light field dictionary matrix or multiplying a light field atom in the light field dictionary matrix, which light field dictionary matrix has, before the imaging sensor takes the measurements, been computed from training sets, which training sets comprise or were extracted from light field functions of light from other scenes, the first scene being at least partially different in appearance than the other scenes, and
   (ii) the SLM is an Optimized SLM with respect to the light field dictionary matrix.

3. A method comprising, in combination:
(a) using an imaging sensor to take measurements of light from a first scene, which light has, after leaving the first scene, passed through or been reflected from a SLM; and
(b) using one or more computer processors to use the measurements of the light as inputs to perform calculations to compute a first light field function of the light;
wherein
   (i) the calculations include multiplying a light field dictionary matrix or multiplying a light field atom in the light field dictionary matrix, which light field dictionary matrix has, before the imaging sensor takes the measurements, been computed from training sets, which training sets comprise or were extracted from light field functions of light from other scenes, the first scene being at least partially different in appearance than the other scenes,
   (ii) the calculations further include computing a coefficient vector $\alpha \in \mathbb{R}^d$ that satisfies an equation $i = \Phi l = \Phi D \alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the first light field function, and $\Phi$ is a matrix that comprises information about a projection of light, modulated by the SLM, onto the imaging sensor,
   (iii) a first light field atom in the light field dictionary matrix comprises information about one or more light rays, or absence of light rays, in a first spatial region,
   (iv) a second light field atom in the light field dictionary matrix comprises information about one or more light rays, or absence of light rays, in a second spatial region, and
   (v) the first and second spatial regions partially overlap each other.

4. A method comprising, in combination:
(a) using an imaging sensor to take measurements of light from a first scene, which light has, after leaving the first scene, passed through or been reflected from a SLM; and
(b) using one or more computer processors to use the measurements of the light as inputs to perform calculations to compute a first light field function of the light;
wherein
   (i) the calculations include multiplying a light field dictionary matrix or multiplying a light field atom in the light field dictionary matrix, which light field dictionary matrix has, before the imaging sensor takes the measurements, been computed from training sets, which training sets comprise or were extracted from light field functions of light from other scenes, the first scene being at least partially different in appearance than the other scenes,
   (ii) the calculations include a first computation of light field information for a first spatial area, and also include a second computation of light field information for a second spatial area, the first and second spatial areas being different, but not necessarily disjoint, sets of points, and
   (iii) the first and second computations are performed in parallel.

5. A method comprising, in combination:
(a) using an imaging sensor to take measurements of light that has passed through or been reflected from a SLM; and
(b) using one or more computer processors to perform calculations to compute a light field function of light incident on the imaging sensor;
wherein
   (i) the calculations include
      (A) multiplying a light field dictionary matrix or multiplying a light field atom in the light field dictionary matrix, and
      (B) computing a coefficient vector $\alpha \in \mathbb{R}^d$ that satisfies an equation $i = \Phi l = \Phi D \alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ is a matrix that comprises information about a projection of light, modulated by the SLM, onto the imaging sensor, and
   (ii) the SLM is an Optimized SLM with respect to the light field dictionary matrix.

6. A method comprising, in combination:
(a) using an imaging sensor to take measurements of light that has passed through or been reflected from a SLM; and
(b) using one or more computer processors to perform calculations to compute a light field function of light incident on the imaging sensor;
wherein
   (i) the calculations include
      (A) multiplying a light field dictionary matrix or multiplying a light field atom in the light field dictionary matrix, and
      (B) computing a coefficient vector $\alpha \in \mathbb{R}^d$ that satisfies an equation $i = \Phi l = \Phi D \alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ is a matrix that comprises information about a projection of light, modulated by the SLM, onto the imaging sensor,
   (ii) the imaging sensor detects light during multiple exposures, and
   (iii) the one or more processors use data collected by the imaging sensor during the multiple exposures to compute a light field function.

7. A method comprising, in combination:
(a) using an imaging sensor to take measurements of light that has passed through or been reflected from a SLM; and
(b) using one or more computer processors to perform calculations to compute a light field function of light incident on the imaging sensor;

wherein
- (i) the calculations include
  - (A) multiplying a light field dictionary matrix or multiplying a light field atom in the light field dictionary matrix, and
  - (B) computing a coefficient vector $\alpha \in \mathbb{R}^d$ that satisfies an equation $i = \Phi l = \Phi D \alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ is a matrix that comprises information about a projection of light, modulated by the SLM, onto the imaging sensor,
- (ii) a first light field atom in the light field dictionary matrix comprises information about one or more light rays, or about absence of light rays, in a first spatial region,
- (iii) a second light field atom in the light field dictionary matrix comprises information about one or more light rays, or about absence of light rays, in a second spatial region, and
- (iv) the first and second spatial regions partially overlap each other.

8. A method comprising, in combination:
- (a) using an imaging sensor to take measurements of light that has passed through or been reflected from a SLM; and
- (b) using one or more computer processors to perform calculations to compute a light field function of light incident on the imaging sensor;

wherein
- (i) the calculations include
  - (A) multiplying a light field dictionary matrix or multiplying a light field atom in the light field dictionary matrix,
  - (B) computing a coefficient vector $\alpha \in \mathbb{R}^d$ that satisfies an equation $i = \Phi l = \Phi D \alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ is a matrix that comprises information about a projection of light, modulated by the SLM, onto the imaging sensor, and
  - (C) a first computation of light field information for a first spatial area, and
  - (D) a second computation of light field information for a second spatial area,
- (ii) the first and second spatial regions partially overlap each other, and
- (iii) the first and second computations are performed in parallel.

9. An apparatus comprising, in combination:
- (a) a SLM;
- (b) an imaging sensor configured to take measurements of light from a first scene, which light has, after leaving the first scene, passed through or been reflected from the SLM; and
- (c) one or more computer processors configured to use the measurements of the light as inputs to perform calculations to compute a first light field function of the light;

wherein
- (i) the calculations include multiplying a light field dictionary matrix or multiplying a light field atom in the light field dictionary matrix, which light field dictionary matrix has, before the measurements, been computed from training sets, which training sets comprise or were extracted from light field functions of light from other scenes, the first scene being at least partially different in appearance than the other scenes, and
- (ii) the SLM is an Optimized SLM with respect to the light field dictionary matrix.

10. An apparatus comprising, in combination:
- (a) a SLM;
- (b) an imaging sensor configured to take measurements of light that has passed through or been reflected from the SLM; and
- (c) one or more computer processors configured to perform calculations to compute a light field function of light incident on the imaging sensor;

wherein
- (i) the calculations include
  - (A) multiplying a light field dictionary matrix or multiplying a light field atom in the light field dictionary matrix, and
  - (B) computing a coefficient vector $\alpha \in \mathbb{R}^d$ that satisfies an equation $i = \Phi l = \Phi D \alpha$, where $D \in \mathbb{R}^{n \times d}$ is the light field dictionary matrix, $i \in \mathbb{R}^m$ is a matrix that comprises information about a sensor image, $l \in \mathbb{R}^n$ is a matrix that is the light field function, and $\Phi$ is a matrix that comprises information about a projection of light, modulated by the SLM, onto the imaging sensor, and
- (ii) the SLM is an Optimized SLM with respect to the light field dictionary matrix.

* * * * *